(12) United States Patent
Yokomizo

(10) Patent No.: US 11,170,273 B2
(45) Date of Patent: Nov. 9, 2021

(54) IMAGE FORMING APPARATUS AND METHOD OF CONTROLLING THE SAME, AND STORAGE MEDIUM

(71) Applicant: CANON KABUSHIKI KAISHA, Tokyo (JP)

(72) Inventor: So Yokomizo, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/575,978

(22) Filed: Sep. 19, 2019

(65) Prior Publication Data

US 2020/0097780 A1 Mar. 26, 2020

(30) Foreign Application Priority Data

Sep. 25, 2018 (JP) .............................. JP2018-179202

(51) Int. Cl.
| | |
|---|---|
| *B41J 2/175* | (2006.01) |
| *G06F 3/12* | (2006.01) |
| *G06K 15/02* | (2006.01) |
| *G06K 15/00* | (2006.01) |
| *B41J 3/50* | (2006.01) |

(52) U.S. Cl.
CPC ........ *G06K 15/021* (2013.01); *B41J 2/17566* (2013.01); *G06K 15/4075* (2013.01); *B41J 3/50* (2013.01); *B41J 2002/17589* (2013.01)

(58) Field of Classification Search
CPC .... G06F 3/1219; G06F 3/1237; G06F 3/1239; G06F 3/1241; B41J 2002/17589
See application file for complete search history.

(56) References Cited

U.S. PATENT DOCUMENTS

| | | | | |
|---|---|---|---|---|
| 5,802,420 A | * | 9/1998 | Garr | ..................... B41J 2/17566 |
| | | | | 399/27 |
| 2016/0223930 A1 | * | 8/2016 | Harada | ................. G06F 3/1219 |
| 2016/0376119 A1 | * | 12/2016 | Fujita | .................... B41J 13/106 |
| | | | | 271/207 |

FOREIGN PATENT DOCUMENTS

JP 2017-037596 A 2/2017

* cited by examiner

*Primary Examiner* — Jason S Uhlenhake
(74) *Attorney, Agent, or Firm* — Venable LLP

(57) ABSTRACT

An image forming apparatus to which a containing a recording material is attached removably includes a specifying unit configured to specify a usage amount of the recording material that has been used for printing in a predetermined period, and a prediction unit configured to predict a remaining period for using the attached container, based on a remaining amount of the recording material contained in the attached cartridge and the specified usage amount. The specified usage amount does not include a usage amount of the recording material which has been used in the predetermined period by the image forming apparatus which has been in a predetermined state.

22 Claims, 5 Drawing Sheets

FIG. 6

| CONSUMABLE PART | MODEL NUMBER | STATUS | REMAINING NUMBER OF DAYS |
|---|---|---|---|
| <CONSUMABLE INFORMATION> | | | |
| COMPONENT T-1 | TAK-1 | 0% | 0 DAYS |
| COMPONENT T-2 | KYO-1 | 5% | 7 DAYS |
| COMPONENT T-3 | KEI-1 | 24% | 41 DAYS |
| COMPONENT T-4 | MAY-1 | 36% | 59 DAYS |

OK

IMAGE FORMING APPARATUS AND METHOD OF CONTROLLING THE SAME, AND STORAGE MEDIUM

BACKGROUND OF THE INVENTION

Field of the Invention

The present invention relates to an image forming apparatus and a method of controlling the same, and a storage medium.

Description of the Related Art

Image forming apparatuses such as printers, copiers, and facsimiles include multiple replaceable consumable parts (consumables), for example, a toner container, a collection toner container, and the like, which are consumed with the operation of the image forming apparatus. The consumable part becomes ultimately unusable due to aging deterioration or by depletion of consumable materials contained in the container constituting the consumable part.

In order to maintain good print quality in the image forming apparatus, a user or service engineer needs to periodically replace each consumable part. In order to replace such consumable part at a proper timing, a technique is known in which a remaining amount of a consumable material such as a toner in a container such as a toner container is predicted, and when the set number of days is reached, a notification is made to a maintenance server that maintains the consumable part, and the distribution of the consumable part is automatically coordinated.

Japanese Patent Laid-Open No. 2017-37596 discloses an image forming apparatus that predicts the remaining amount of toner and set the number of days for delivery, issues a delivery request to a maintenance server of consumable parts when the remaining amount of toner corresponds to the set number of days, and delivers a next toner cartridge before the toner becomes depleted. This may prevent downtime of the image forming apparatus from occurring while keeping the storage period of the toner cartridge to the minimum.

As described above, in order to properly determine the replacement timing of the consumable part, it is necessary to accurately predict the remaining number of days, in which the consumable part is usable for printing. The prediction of the remaining number of days may be performed, for example, for the toner container, by assuming that the toner is consumed at a generally constant rate, and linearly approximating a change in the remaining amount of the toner in the toner container to predict when the remaining amount of toner becomes 0. That is, assuming that the consumption level of the consumable part changes at a constant rate, the remaining number of days for the consumable part is predicted based on the change in the consumption level.

However, in the image forming apparatus, the usage amount of the consumable part (toner or the like) may suddenly change in different uses than the use of general users, for example, the use of a service engineer for maintenance. For example, in a case where a number of particular images (solid images) are printed in a particular operation mode, more toner is temporarily consumed than usual. As a result, the prediction accuracy of the remaining number of days for the consumable part (toner container or the like) may decrease.

SUMMARY OF THE INVENTION

The present invention provides a technique for, in an image forming apparatus that predicts a remaining number of days for a consumable part based on the consumption level of a consumable part (consumable), preventing the prediction accuracy from decreasing in a case where the consumable part is differently used than in a normal case.

According to one aspect of the present invention, there is provided an image forming apparatus comprising: an obtainment unit configured to obtain a usage amount of a recording material used for image formation, the recording material being stored in a container removably attached to the image forming apparatus; and a prediction unit configured to predict a remaining number of days in which the recording material in the container is usable for printing, based on a number of usage days from start of use of the recording material and the usage amount of the recording material obtained by the obtainment unit, wherein the prediction unit predicts the remaining number of days based on use of the recording material except for use of the recording material in a predetermined job.

According to another aspect of the present invention, there is provided a method of controlling an image forming apparatus, the method comprising: obtaining a usage amount of a recording material used for image formation, the recording material being stored in a container removably attached to the image forming apparatus; and predicting a remaining number of days in which the recording material in the container is usable for printing, based on a number of usage days from start of use of the recording material and the obtained usage amount of the recording material, wherein the remaining number of days is predicted based on use of the recording material except for use of the recording material in a predetermined job.

According to still another aspect of the present invention, there is provided a non-transitory computer-readable storage medium storing a computer program for causing a computer to execute a method of controlling an image forming apparatus, the method comprising: obtaining a usage amount of a recording material used for image formation, the recording material being stored in a container removably attached to the image forming apparatus; and predicting a remaining number of days in which the recording material in the container is usable for printing, based on a number of usage days from start of use of the recording material and the obtained usage amount of the recording material, wherein the remaining number of days is predicted based on use of the recording material except for use of the recording material in a predetermined job.

Further features of the present invention will become apparent from the following description of exemplary embodiments (with reference to the attached drawings).

BRIEF DESCRIPTION OF THE DRAWINGS

FIG. 6 is a view illustrating an example of a screen displaying the remaining number of days for the consumable part.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Image Formation Apparatus>

Figure 1:
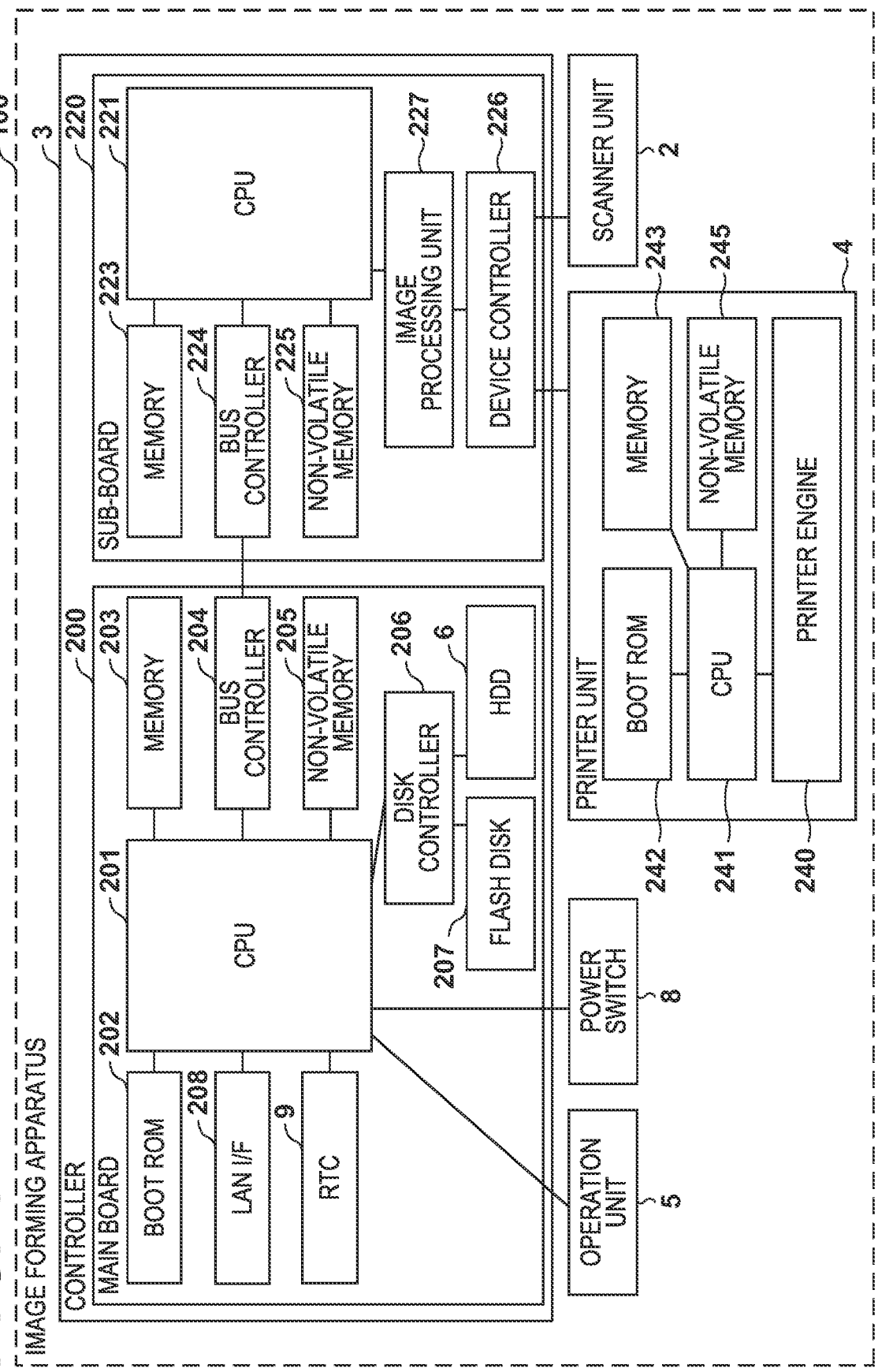
FIG. 1 is a block diagram illustrating an example of a hardware configuration of an image forming apparatus.

FIG. 1 is a block diagram illustrating a hardware configuration of an image forming apparatus 100 according to an embodiment of the present invention. The image forming apparatus 100 includes a controller 3, and a scanner unit 2, a printer unit 4, an operation unit 5, and a power switch 8, which are connected to the controller 3. The controller 3 includes a main board 200 and a sub-board 220. The main board 200 performs job control for image formation. The sub-board 220 is a subsystem that includes image processing hardware.

The main board 200 includes a CPU 201, a boot ROM 202, a memory 203, a bus controller 204, a non-volatile memory 205, a disk controller 206, a LAN interface (I/F) 208, and a real time clock (RTC) 9. The main board 200 further includes an HDD 6 and a flash disk 207, which are connected to the disk controller 206.

The CPU 201 controls the entire main board 200. The boot ROM 202 stores a boot program for the image forming apparatus 100. The memory 203 is used as a work memory by CPU 201. The bus controller 204 is connected to bus controller 224 of sub-board 220 and has a bridge function with an external bus. The disk controller 206 controls the HDD 6 and the flash disk 207, which are storage devices. The HDD 6 is used as an auxiliary storage device. The flash disk 207 is a storage device composed of a semiconductor device having a smaller capacity than the HDD 6. The LAN I/F 208 is connected to LAN and communicates with external devices via the LAN. The RTC 9 is an IC with a clock function and is used for time management.

The operation unit 5 and the power switch 8 are connected to the main board 200. The operation unit 5 includes a liquid crystal display having a touch panel function and various hard keys, and functions as a display unit configured to display information, and an acceptance unit configured to accept an instruction from a user. The power switch 8 is a switch for switching on/off of the power source of the image forming apparatus 100.

The sub-board 220 includes a CPU 221, a memory 223, a bus controller 224, non-volatile memory 225, an image processing unit (image processor) 227, and a device controller 226. The CPU 221 controls the entire sub-board 220. The memory 223 is used as a work memory by the CPU 221. The bus controller 224 is connected to bus controller 204 of main board 200 and has a bridge function with an external bus. The image processing unit 227 applies various digital image processing to image data outputted to the printer unit 4 and image data inputted from the scanner unit 2. The device controller 226 is connected to the scanner unit 2 and the printer unit 4 to control these devices.

The scanner unit 2 optically scans an image of an original and converts it into image data, and outputs the image data to the controller 3 (device controller 226). The printer unit 4 forms (prints) an image on a recording medium such as a sheet, based on the image data inputted from the controller 3 (device controller 226). Although not illustrated in FIG. 1, the image forming apparatus 100 may further include devices such as a chipset, a bus bridge, a clock generator, etc., as peripheral hardware devices of the CPU 201 and the CPU 221.

The printer unit 4 includes a printer engine 240, a CPU 241, a boot ROM 242, memory 243, and a non-volatile memory 245. The CPU 241 controls the printer engine 240 by controlling devices such as various motors and sensors provided on the printer engine 240. The memory 243 is used as a work memory by the CPU 241. The boot ROM 242 stores a boot program for the printer unit 4.

The printer engine 240 has an image formation mechanism that fixes toner to the sheet to form an image in an electrophotographic method. Note that the printer engine 240 may employ an ink-jet method of discharging ink to the sheet to form an image. The electrophotographic recording material is the toner, and the inkjet recording material is the ink. The printer engine 240 is removably equipped with a plurality of consumable parts, such as a toner container (toner bottle) and a collection toner container, and each consumable part is configured to be replaceable by a user or service engineer. The collection toner container contains used toner collected from an image carrier such as a photosensitive drum or an intermediate transfer belt.

The "consumption" herein means that, for the toner container (container), the remaining amount of toner in the container decreases (toner is used), and for the collection toner container, the amount of toner contained in the container increases without being used for image formation. The remaining or usage amount of toner in the toner container, which indicates the consumption level of the consumable part, may be obtained, for example, based on the cumulative number of rotations of the toner container for discharging the toner, or the number of supplies of the toner to a developer. Also, the amount of toner in the collection toner container may be detected using, for example, an optical sensor.

Hereinafter, using the toner container as the consumable part of the image forming apparatus 100, a process of predicting the remaining number of days in which the consumable part is usable will be described below. In the image forming apparatus 100 of the present embodiment, the remaining number of days is predicted based on the consumption level of the consumable part. In doing so, as described below, the prediction accuracy of the remaining number of days is improved by predicting the remaining number of days for the consumable part in consideration of the use in a print job (particular job) entered according to a particular input method.

<Recording of Use Start Date of Consumable Part>

Figure 2:
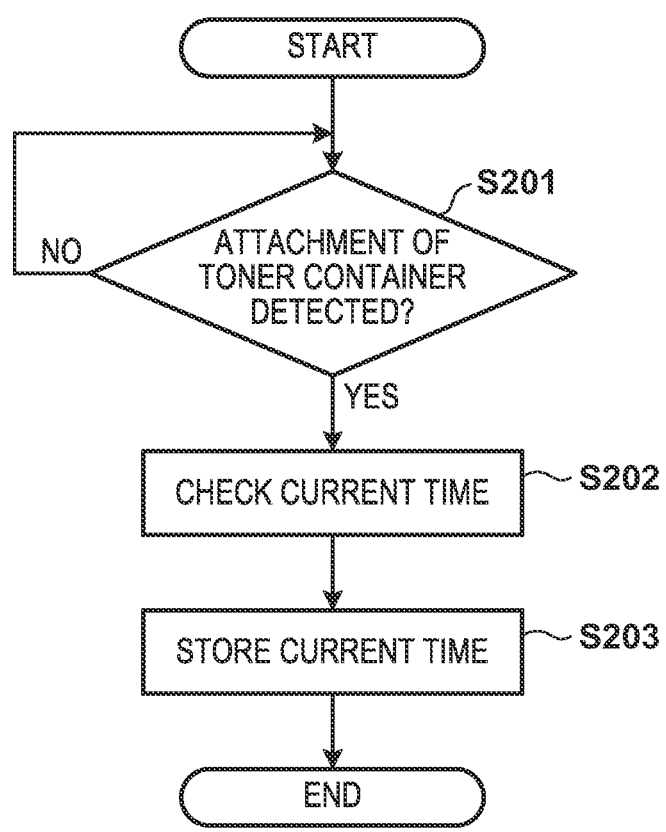
FIG. 2 is a flowchart illustrating a procedure of processing of recording the start date of use of a consumable part.

FIG. 2 is a flowchart illustrating a procedure of processing of recording the start date of use of the consumable part of the image forming apparatus 100. Here, as an example, a processing of storing a time when the toner container is attached to the image forming apparatus 100 will be described. Note that each step in FIG. 2 is implemented by reading and executing the program stored in the non-volatile memory 245 by the CPU 241 of the printer unit 4.

The CPU 241 of the printer unit 4 determines whether or not the toner container is attached to the printer engine 240 at step S201, and advances the processing to step S202 upon detecting the attachment of the toner container. At step S202, the CPU 241 inquires to the controller 3 about the current time. The controller 3 checks the current time by the RTC 9 and notifies the current time to the printer unit 4. The CPU 241 stores the current time notified from the controller 3 in the non-volatile memory 245 as information indicating the start date of use of the consumable part at step S203, and terminates the processing. Note that in a case where time is periodically notified from the controller 3 to the CPU 241, the notified time may be saved.

<Measurement of Consumption Level of Consumable Part>

Figure 3:
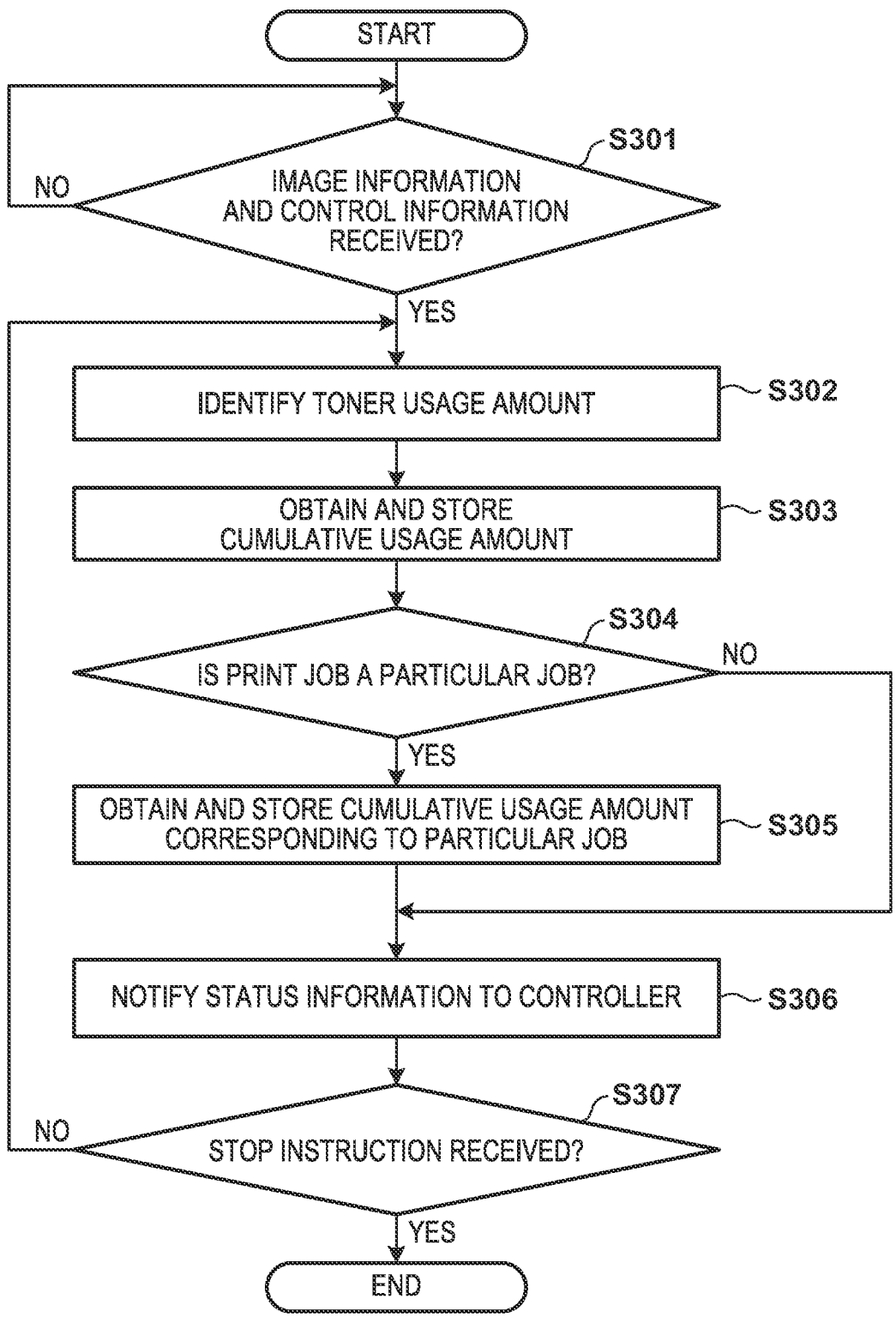
FIG. 3 is a flowchart depicting a procedure of processing of measuring consumption level of the consumable part.

Next, a processing of measuring the consumption level of the consumable part attached to the image forming apparatus 100 will be described with reference to FIG. 3. FIG. 3 is a flowchart illustrating a procedure of the processing of measuring the consumption level of the toner container as the consumable part of the image forming apparatus 100. Each step in FIG. 3 is implemented by reading and executing the program stored in the non-volatile memory 245 by the CPU 241 of the printer unit 4.

The controller 3 (CPU 201) accepts an input of the print job from the external device via the network or the operation unit 5, and upon start of the execution of the print job, checks whether or not the print job is a predetermined particular job. The controller 3 (CPU 221) uses the image processing unit 227 to generate image information (image data) for each page included in the print job, and transmits the generated image information for each page to the printer unit 4. In addition, the controller 3 (CPU 221) transmits control information along with the image information to the printer unit 4. In a case where a print job to be executed is a particular job, the control information may include information indicating that the print job is the particular job, as one of job control parameters.

Here, the particular job is a print job that is entered using a particular input method that is not used by general users or a particular input method that is not used in normal use. For example, the particular input method is an input via an operation screen for the service engineer or an input via an operation screen capable of instructing correction of image density or image unevenness. In such particular job, the printer unit 4 may print a particular image, such as a solid image or an image having a particular pattern. In printing such particular images, more toner may be temporarily consumed as compared to printing of images in normal use.

At step S301, the CPU 241 of the printer unit 4 determines whether or not it has received the image information and the control information, which are related to the print job, from the controller 3. Upon receiving the image information and the control information, the CPU 241 causes the printer engine 240 to start printing an image based on the received image information and advances the processing to step S302.

At step S302, the CPU 241 identifies the usage amount of toner to print the image (used to develop the toner image) based on the received image information. The usage amount of toner corresponds to the amount of toner supplied from the toner container to the developer. Further, at step S303, the CPU 241 obtains the cumulative usage amount of the toner from start of use of the toner container, stores the obtained cumulative usage amount in the non-volatile memory 245, and advances the processing to step S304. For example, the CPU 241 adds the usage amount identified at step S302 to the cumulative usage amount stored in the non-volatile memory 245, thereby measuring the current cumulative usage amount. The cumulative usage amount corresponds to the consumption level of the toner container (consumable part).

At step S304, the CPU 241 determines whether or not the print job being executed is a particular job based on the received control information. The CPU 241 advances the processing to step S305 if the print job is the particular job and advances the processing to step S306 if the print job is not the particular job. Further, at step S305, the CPU 241 obtains the cumulative usage amount of the toner in the particular job from start of use of the toner container, stores the obtained cumulative usage amount in the non-volatile memory 245, and advances the processing to step S306. For example, the CPU 241 adds the usage amount identified at step S302 to the cumulative usage amount corresponding to the particular job, which is stored in non-volatile memory 245, thereby measuring the current cumulative usage amount corresponding to the particular job.

At step S306, upon completion of the printing processing on one page, the CPU 241 notifies status information indicating the completion of the printing processing to the controller 3 and advances the processing to step S307. At step S307, the CPU 241 determines whether or not it has received a stop instruction from the controller 3. The CPU 241 returns the processing back to step S302 and receives image information about the next page if no stop instruction has been received, and terminates the processing if the stop instruction has been received.

<Prediction of Remaining Number of Days for Consumable Part>

Figure 4:
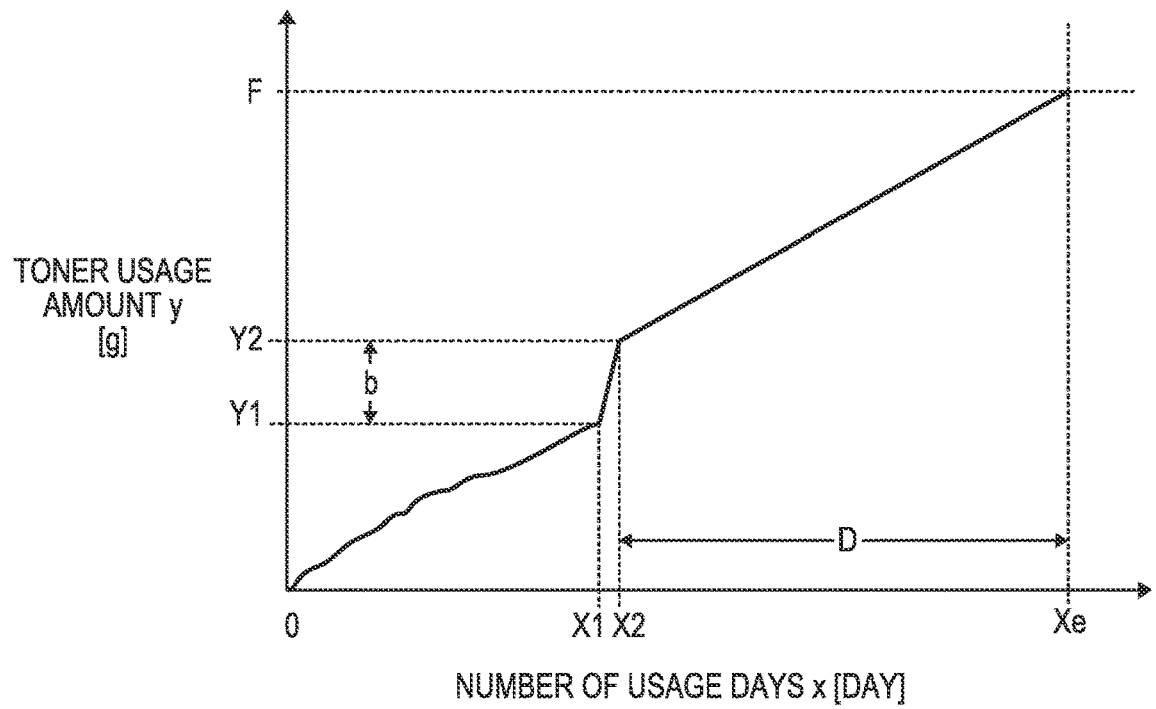
FIG. 4 is a chart illustrating an example of a transition of the consumption level of the consumable part and prediction of the remaining number of days for the consumable part.

Next, processing of predicting the remaining number of days for the consumable part attached to the image forming apparatus 100 will be described with reference to FIG. 4. FIG. 4 is a chart illustrating an example of a transition of the consumption level of the consumable part and prediction of the remaining number of days for the consumable part. FIG. 4 illustrates an example of relationship between the number of usage days from start of use of the toner container and the cumulative usage amount of the toner in the toner container. The horizontal axis represents the number of usage days and the vertical axis represents the cumulative usage amount of the toner. Note that the cumulative usage amount illustrated in FIG. 4 corresponds to the cumulative usage amount obtained by the processing at step S303.

In the example of FIG. 4, the image forming apparatus 100 is normally used by the general user in a period from the start date of use (the number of usage days 0) to a time X1. It is assumed that the average toner usage amount per day by the general user does not change rapidly (i.e., is generally constant). Thus, the cumulative usage amount in this period may be linearly approximated. Note that the start date of use is identified based on the information stored in the non-volatile memory 245 at step S203.

Thereafter, the image forming apparatus 100 is used differently from the use of the general user in a period of time from the time X1 to a time X2. For example, execution of a particular job that prints a particular pattern graphic uses more toner to results in a rapid change in the average toner usage amount, which leads to an abrupt increase in the cumulative usage amount. Here, the cumulative usage amount of the toner used by executing the particular job is denoted as b. This value b indicates the cumulative usage amount corresponding to the particular job, which is obtained in the processing at step S305.

In this embodiment, the remaining number of days for the toner container is predicted based on the number of usage days of the toner container (consumable part), the cumulative usage amount measured at step S303, and the usage amount (cumulative usage amount) corresponding to the particular job. In this prediction, the remaining number of days is predicted according to a predictive model corresponding to use of the toner container except for use for a predetermined particular job. According to a predictive model described below, a change in the cumulative usage amount (consumption level) of the toner container except for use for the predetermined particular job from start of use of the toner container (consumable part) is linearly approximated to predict the remaining number of days.

Specifically, in consideration of the cumulative usage amount b corresponding to the particular job described above, the cumulative usage amount y of the toner in the toner container is represented by a following equation:

$$y=ax+b \quad (1)$$

Here, x is the number of usage days from the start date of use of the toner container attached to the printer engine 240, and a is a slope obtained when the cumulative usage amount of the toner is linearly approximated in a period from the start date of use to the time X1.

The slope a of Equation (1) corresponds to the average toner usage amount per day by the general user and is found by the following equation:

$$a=(y-b)/x \quad (2)$$

Note that in the present embodiment, the period during which the particular job is used (X1 to X2 period) is ignored as being sufficiently short. In this manner, the change in the consumption level (cumulative usage amount) of the container is linearly approximated using the cumulative usage amount obtained by subtracting the cumulative usage amount b corresponding to the particular job from the cumulative usage amount y measured at step S303, and the number of usage days x.

The number of days Xe from the start date of use of the toner container to the date when the remaining amount of the toner in the toner container becomes 0 (the toner in the toner container becomes depleted) is found using a capacity F of the toner container by the following equation:

$$Xe=(F-b)/a \quad (3)$$

Note that the capacity F corresponds to the amount of the toner contained in the toner container before start of use of the toner. Thus, the remaining number of days D for the toner container from the current time X2 (the remaining number of days in which the toner container is usable) is found by a following equation:

$$D=Xe-X2 \quad (4)$$

As described above, in the image forming apparatus 100 of the present embodiment, the cumulative usage amount b corresponding to the particular job in the case of performing the particular job other than the normal use of the consumable part by the general user is measured. Furthermore, when predicting the remaining number of days for the consumable part (toner container), the cumulative usage amount b is considered as a parameter for linearly approximating the usage amount of the consumable part. That is, the remaining number of days D is predicted according to the predictive model corresponding to use of the consumable part (toner container) except for use in the particular job. This may improve the prediction accuracy of the remaining number of days for the consumable part.

<Display of Remaining Number of Days for Consumable Part>

Figure 5:
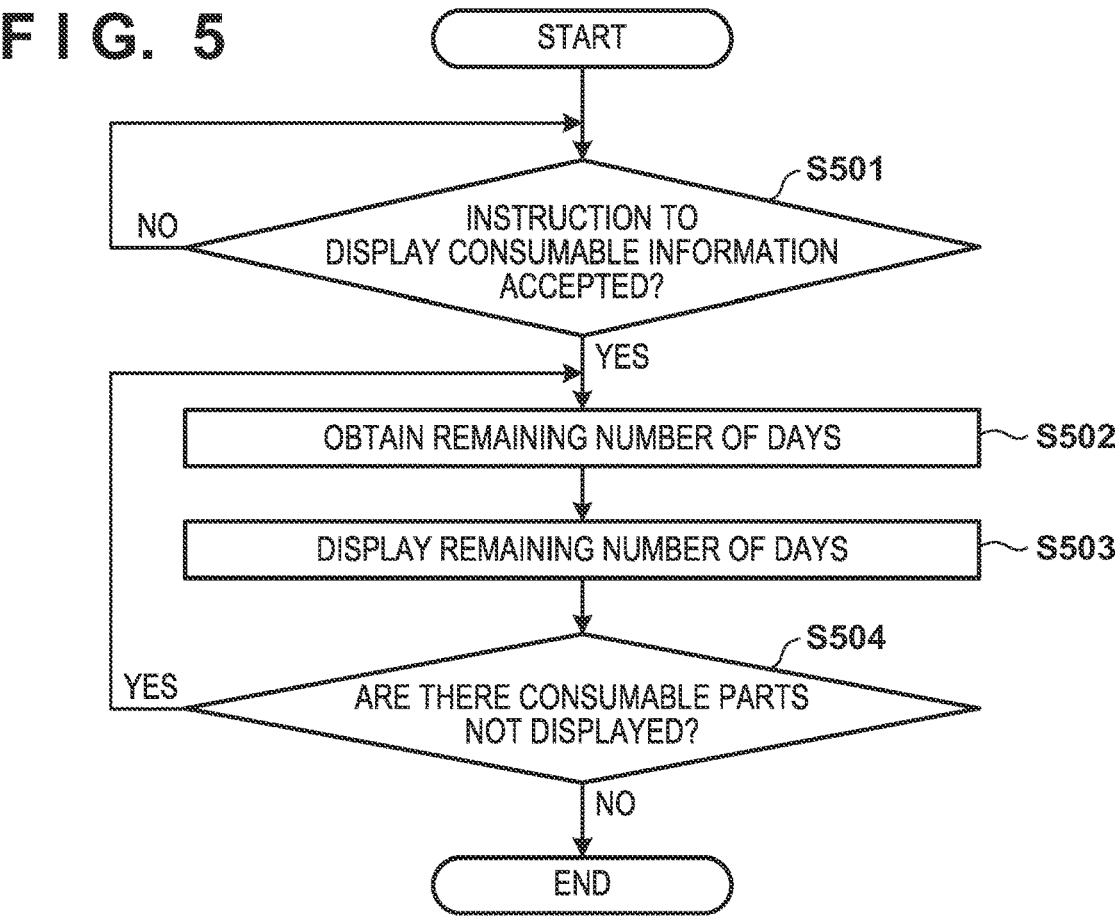
FIG. 5 is a flowchart illustrating a procedure of processing of displaying the remaining number of days for the consumable part.

Next, an example of display of the remaining number of days for the consumable part attached to the image forming apparatus 100 will be described with reference to FIGS. 5 and 6. FIG. 5 is a flow chart illustrating a procedure of processing of displaying the remaining number of days for the consumable part, which is executed by the CPU 201 of the controller 3. The CPU 201 reads and executes the program stored in a storage device such as the non-volatile memory 205, thereby implementing processing in each step in FIG. 5.

At step S501, the CPU 201 determines whether or not it has accepted an instruction to display information about the consumable part from the user by, for example, detecting pressing of a display button of the operation unit 5, and advances the processing from step S501 to step S502 upon accepting the display instruction.

At step S502, the CPU 201 inquires to the printer unit 4 about the remaining number of days for the consumable part included in the printer unit 4 (toner container in the present example), thereby obtaining information about the remaining number of days for the consumable part from the printer unit 4. In response to the inquiry from the CPU 201, the printer unit 4 predicts the remaining number of days for the consumable part according to the method described above with reference to FIG. 4, and notifies the CPU 201 of the predicted result of the remaining number of days.

Thereafter, at step S503, the CPU 201 displays the remaining number of days for the consumable part notified from the printer unit 4 on the operation unit 5 and advances the processing to step S504. FIG. 6 is a view illustrating an example of an operation screen displayed on the operation unit 5 at step S503. The CPU 201 lists information about the consumable part and the remaining number of days for each consumable part in a region 601 of an operation screen 600 in FIG. 6, so as to notify the remaining number of days for each consumable part to the user.

At step S504, the CPU 201 determines whether or not any other consumable part that is not displayed on the operation screen 600 is present, and returns the processing to step S502 if present, and terminates the processing if not present. As a result, information and the remaining number of days about each consumable part attached to the image forming apparatus 100 are sequentially displayed in the region 601 of the operation screen 600 at step S503.

As described above, in the present embodiment, the image forming apparatus 100 measures the consumption level of the consumable part (such as the toner container or the collection toner container) that is removably attached to the apparatus and used to form an image using the printer unit 4. The image forming apparatus 100 obtains the usage amount of the consumable part in image formation performed in accordance with the predetermined particular job. Furthermore, the image forming apparatus 100 predicts the remaining number of days for the consumable part based on the number of usage days from start of use of the consumable part, the measured consumption level, and the usage amount corresponding to the particular job. In this prediction, the remaining number of days is predicted according to the predictive model corresponding to use of the consumable part except for use of the consumable part in the particular job.

Thus, in the present embodiment, the prediction model corresponding to use of the consumable part except for use of the consumable part in the particular job that is assumed to use the consumable part in a usage amount different than in a normal use is used as the prediction model for predicting the remaining number of days for the consumable part. This enables to prevent the prediction accuracy of the remaining number of days for the consumable part from degrading, even in a case where the consumable part is differently used than a normal use for a while (for example, a case where more toner in the toner container is temporarily consumed than usual). That is, according to the present embodiment, it is possible to, in the image forming apparatus 100 that predicts the remaining number of days for the consumable part based on the consumption level of the consumable part, prevent the prediction accuracy from degrading in a case where the consumable part is differently used than in a normal case.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-179202, filed Sep. 25, 2018, which is hereby incorporated by reference herein in its entirety.

What is claimed is:

1. An image forming apparatus to which a container containing a recording material is removably attached, comprising:
a first obtaining unit configured to obtain a usage amount of the recording material that is used for printing in a predetermined period; and
a prediction unit configured to predict a period of the attached container, based on a remaining amount of the recording material contained in the attached container and the obtained usage amount,
wherein the obtained usage amount of the recording materials does not include a usage amount of the recording material which has been used by the image forming apparatus which has been in a predetermined state within the predetermined period.

2. The image forming apparatus according to claim 1, wherein the prediction unit predicts the period by performing a linear approximation based on the obtained usage amount of the recording material.

3. The image forming apparatus according to claim 2, further comprising:
a second obtaining unit configured to obtain a first cumulative usage amount of the recording material in the predetermined period; and
a third obtaining unit configured to obtain a second cumulative usage amount of the recording material which has been used in the predetermined period by the image forming apparatus which has been in the predetermined state,
wherein the prediction unit performs the linear approximation based on a cumulative usage amount obtained by subtracting the second cumulative usage amount from the first cumulative usage.

4. The image forming apparatus according to claim 1, wherein
the recording material is a toner used for the image formation.

5. The image forming apparatus according to claim 1, further comprising:
a display,
wherein the predetermined state is a state where a predetermined screen that is displayed according to a predetermined method is displayed on the display.

6. The image forming apparatus according to claim 5, wherein the predetermined screen is an operation screen for a service engineer or an operation screen capable of instructing correction of image density.

7. The image forming apparatus according to claim 1, wherein an image that is printed when the image forming apparatus is in the predetermined state is a predetermined image.

8. The image forming apparatus according to claim 7, wherein the predetermined image is a solid image, or an image having a particular pattern.

9. The image forming apparatus according to claim 1, further comprising a notification unit configured to notify a user of the period predicted by the prediction unit.

10. The image forming apparatus according to claim 1, wherein the obtaining unit obtains the usage amount by subtracting, from a cumulative usage amount of the recording material which has been used in the predetermined period after the container is attached to the image forming apparatus, the usage amount of the recording material which has been used in the predetermined period by the image forming apparatus which has been in a predetermined state.

11. The image forming apparatus according to claim 10, wherein the prediction unit predicts the period based on a usage amount of the recording material per day that is based on the specified usage amount and the predetermined usage amount.

12. The image forming apparatus according to claim 10, wherein the prediction unit calculates an average usage amount of the recording material per another predetermined period based on the specified usage amount and the predetermined period, and predicts the period based on the calculated average usage amount.

13. The image forming apparatus according to claim 1, wherein the predetermined state is a state in which the image forming apparatus executes printing based on a print instruction received via a predetermined screen.

14. The image forming apparatus according to claim 13, wherein the predetermined screen is a screen for a service engineer or a screen capable of instructing correction of image density or image unevenness.

15. A method of controlling an image forming apparatus to which a container containing a recording material is removably attached, the method comprising:

obtaining a usage amount of the recording material that is used for printing in a predetermined period; and predicting a period for using the attached container, based on a remaining amount of the recording material contained in the attached container and the obtained usage amount, wherein the specified usage amount does not include a usage amount of the recording material which has been used by the image forming apparatus which has been in a predetermined state within the predetermined period.

16. The method according to claim 15, wherein the usage amount is specified by subtracting, from a cumulative usage amount of the recording material which has been used in the predetermined period after the container is attached to the image forming apparatus, the usage amount of the recording material which has been used in the predetermined period by the image forming apparatus which has been in a predetermined state.

17. The method according to claim 16, wherein the period is predicted based on a usage amount of the recording material per day that is based on the specified usage amount and the predetermined usage amount.

18. The method according to claim 16, wherein the predicting comprises calculating an average usage amount of the recording material per another predetermined period based on the specified usage amount and the predetermined period, and predicting the period based on the calculated average usage amount.

19. A non-transitory computer-readable storage medium storing a computer program for causing a computer to execute a method of controlling an image forming apparatus to which a container containing a recording material is removably attached, the method comprising:

obtaining a usage amount of the recording material that is used for printing in a predetermined period; and predicting a period for using the attached container, based on a remaining amount of the recording material contained in the attached container and the specified usage amount, wherein the specified usage amount does not include a usage amount of the recording material which has been used by the image forming apparatus which has been in a predetermined state within the predetermined period.

20. The storage medium according to claim 19, wherein the usage amount is obtained by subtracting, from a cumulative usage amount of the recording material which has been used in the predetermined period after the container is attached to the image forming apparatus, the usage amount of the recording material which has been used in the predetermined period by the image forming apparatus which has been in a predetermined state.

21. The storage medium according to claim 20, wherein the period is predicted based on a usage amount of the recording material per day that is based on the specified usage amount and the predetermined usage amount.

22. The storage medium according to claim 20, wherein the predicting comprises calculating an average usage amount of the recording material per another predetermined period based on the specified usage amount and the predetermined period, and predicting the period based on the calculated average usage amount.

* * * * *